(12) United States Patent
Desmarchelier et al.

(10) Patent No.: US 11,709,078 B2
(45) Date of Patent: Jul. 25, 2023

(54) HIGH-TEMPERATURE-RESISTANT BRAGG GRATING OPTICAL FIBRE SENSOR AND METHOD FOR MANUFACTURING SAME

(71) Applicant: COMMISSARIAT A L'ENERGIE ATOMIQUE ET AUX ENERGIES ALTERNATIVES, Paris (FR)

(72) Inventors: Rudy Desmarchelier, Toury (FR); Guillaume Laffont, Meudon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 271 days.

(21) Appl. No.: 17/284,196

(22) PCT Filed: Oct. 11, 2019

(86) PCT No.: PCT/FR2019/052422
§ 371 (c)(1),
(2) Date: Apr. 9, 2021

(87) PCT Pub. No.: WO2020/074843
PCT Pub. Date: Apr. 16, 2020

(65) Prior Publication Data
US 2021/0341314 A1 Nov. 4, 2021

(30) Foreign Application Priority Data
Oct. 12, 2018 (FR) ...................................... 18 59499

(51) Int. Cl.
*G01D 5/353* (2006.01)
*G02B 6/02* (2006.01)

(52) U.S. Cl.
CPC ..... *G01D 5/35316* (2013.01); *G02B 6/02147* (2013.01)

(58) Field of Classification Search
CPC ............ G01D 5/35316; G02B 6/02147; G02B 6/02395
See application file for complete search history.

(56) References Cited

U.S. PATENT DOCUMENTS 6,272,886 B1 8/2001 Novack et al.
2001/0020375 A1* 9/2001 Novack .............. G02B 6/02123
65/529

(Continued)

FOREIGN PATENT DOCUMENTS

WO WO 98/18031 A1 4/1998

OTHER PUBLICATIONS

International Search Report dated Feb. 25, 2020 in PCT/FR2019/052422 filed on Oct. 11, 2019, 3 pages.

(Continued)

*Primary Examiner* — Tony Ko
(74) *Attorney, Agent, or Firm* — Oblon, McClelland, Maier & Neustadt, L.L.P.

(57) ABSTRACT

A Bragg grating optical fiber sensor for measuring temperatures and deformations and a method for manufacturing same, the manufacturing method including ablating a mechanical coating over a portion of an optical fiber so as to form an opening extending radially over the entire thickness of the mechanical coating, and inscribing a Bragg grating into the optical fiber through the opening.

20 Claims, 2 Drawing Sheets

(56) References Cited

U.S. PATENT DOCUMENTS

2014/0180031 A1* 6/2014 Anderson .............. A61B 8/06
600/478
2017/0285261 A1 10/2017 Miyamoto et al.
2021/0348970 A1* 11/2021 Roussel ................ G02B 6/021

OTHER PUBLICATIONS

French Preliminary Search Report dated Oct. 1, 2019 in French Application No. 18 59499 filed on Oct. 12, 2018 (with translation of category of cited documents), 2 pages.
Mihailov et al., "Applications of femtosecond laser induced Bragg gratings in silica and non-silica based optical fibers", Proc. of SPIE, 2010, vol. 7589, pp. 1-12, XP040517920.
Yang et al., "Fiber Bragg gratings inscriptions in multimode fiber using 800 nm femtosecond laser for high-temperature strain measurement", Optics and Laser Technology, 2017, vol. 93, pp. 138-142, XP029970347.

* cited by examiner

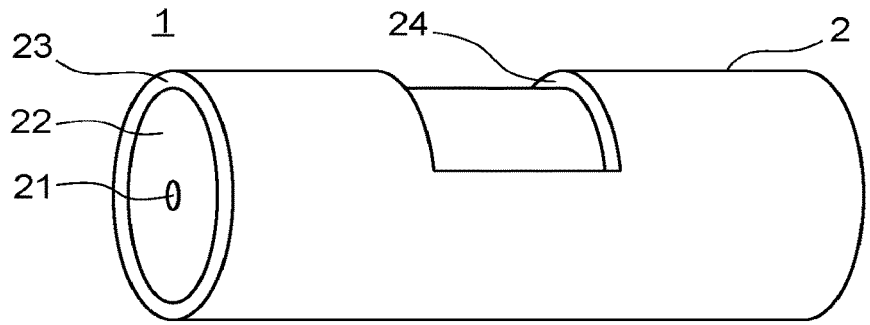
FIG. 1A
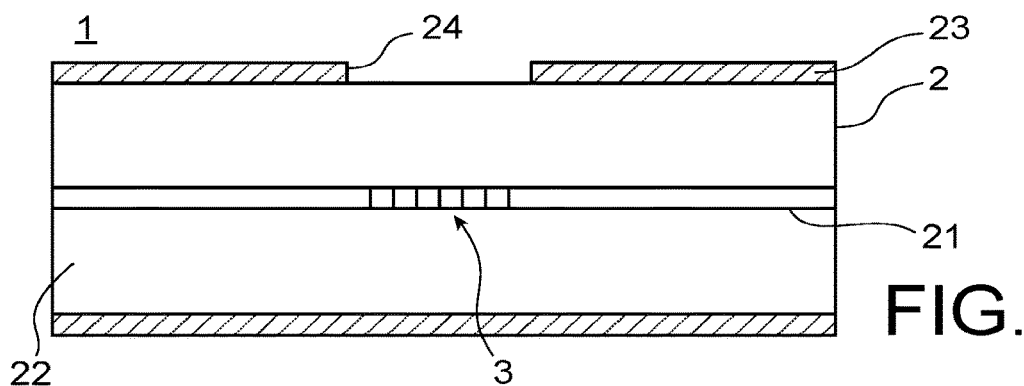
FIG. 1B
FIG. 2

HIGH-TEMPERATURE-RESISTANT BRAGG GRATING OPTICAL FIBRE SENSOR AND METHOD FOR MANUFACTURING SAME

TECHNICAL FIELD

The invention is situated in the field of temperature and deformation sensors and, more precisely, in the field of Bragg grating optical fibre sensors for measuring temperatures and deformations in a high-temperature environment, typically above 800° C. It relates to such a sensor as well as the method for manufacturing same.

The invention applies in particular to the real-time monitoring of temperature and deformations in a difficult environment, for example in the nuclear or aeronautical field. The temperature sensor may be integrated on the surface of a structure to be monitored, or even integrated within this structure. It is then possible to implement structural health monitoring.

PRIOR ART

Structural health monitoring consists in measuring the thermal and/or mechanical stresses applied to a structure and to deduce therefrom a state of this structure, in particular the presence of damage. Bragg grating optical fibre sensors are particularly suitable for making such measurements. They make it possible to provide temperature and deformation measurements both in static or quasi-static regime and in dynamic regime. It is in particular possible to make vibration measurements or acceleration measurements or to detect acoustic waves. The data collected can then be used to detect and characterise the presence of damage in the structure. Furthermore, the same optical fibre sensor may include a plurality of Bragg gratings acting in bands with differentiated wavelengths and thus providing as many sensitive elements for the same optical fibre, these sensitive elements being able to be addressed individually by spectral multiplexing. Individual addressing is also possible by time multiplexing or by multiplexing that is both spectral and temporal. It is then furthermore possible to locate damage in the structure. However, optical fibres of this type of sensor have insufficient mechanical strength at high temperatures, typically a few hundreds of degrees Celsius. In particular, an optical fibre, the mechanical coating of which is made from polyimide cannot be exposed to temperatures above 350° C., at the risk of degradation of the mechanical coating. The optical fibre is then no longer mechanically protected and risks breaking, all the more so when it is at the same time subjected to relatively high mechanical stresses.

A second type of sensor may be used to make distributed measurements of temperature or deformation in a structure. This type of sensor is based on the technique of optical frequency domain reflectometry (OFDR). The technique consists of using the signal backscattered in the core of an optical fibre by Rayleigh diffusion. This type of sensor can be used in a high-temperature environment by applying a metal covering, for example made from gold or aluminium, on the mechanical-protection coating of the optical fibre, or even directly on the optical cladding. The metal covering is applied during the process of manufacturing the optical fibre, after the drawing stage. It reinforces the mechanical strength of the optical fibre. However, when the optical fibre is subjected to high temperatures, the measurements suffer drift that makes them difficult to use. Furthermore, the spatial resolution of this type of sensor is superior to that of a Bragg grating optical fibre sensor and its measurement range significantly lower.

One solution for obtaining a temperature and deformation sensor based on an optical fibre that would have at the same time low spatial resolution, long range and good mechanical strength at high temperature would consist of producing a Bragg grating optical fibre sensor from an optical fibre including a metal covering on its surface. Producing such a sensor is nevertheless prevented because the metal covering blocks the laser radiation used for inscribing the Bragg grating in the optical fibre.

The application WO 98/18031 A1 describes a device for inscribing a Bragg grating in an optical fibre by means of a device arranged to remove the mechanical coating over a portion of optical fibre prior to the inscription of the Bragg grating. The mechanical coating is removed over the whole of the portion of optical fibre, which greatly weakens the optical fibre and makes it necessary to once again re-cover the portion of optical fibre with a protective covering after the inscription of the Bragg grating.

Having regard to the above, the objective of the invention is to provide a temperature and deformation sensor for a high-temperature environment that has low spatial resolution, long range and stability of measurements over time. Another object of the invention is providing a temperature and deformation sensor providing distributed measurements and being able to be easily integrated in a structure. Another objective of the invention is providing a temperature and deformation sensor the design, manufacture and maintenance costs of which are compatible with use on an industrial scale.

DESCRIPTION OF THE INVENTION

To this end, the invention is based on the formation of an opening, also referred to as a "window", in a mechanical-protection covering surrounding the core and the optical cladding of an optical fibre in order to enable a Bragg grating to be inscribed through this opening. The mechanical-protection covering, also referred to as a "mechanical coating", can thus be formed from any material, independently of its suitability for allowing the laser radiation necessary for inscribing the Bragg grating to pass.

More precisely, the object of the invention is a Bragg grating optical fibre sensor comprising an optical fibre including a core, an optical cladding surrounding the core and a mechanical coating surrounding the optical cladding. According to the invention, the mechanical coating comprises an opening extending radially over the entire thickness thereof and the optical fibre includes a Bragg grating inscribed in the core at the opening.

The optical fibre is typically a single-mode optical fibre. It may have a core diameter of less than 10 μm (micrometres), an optical-cladding diameter of between 80 μm and 150 μm and a mechanical-coating diameter of between 200 μm and 400 μm. In particular, the mechanical coating has for example a diameter of 250 μm.

The optical fibre may include one or more additional protective coatings. In particular, it may include an additional protective coating interposed between the optical cladding and the mechanical coating. This additional protective coating is for example made from polyimide or acrylate. The opening may then extend radially solely over the thickness of the mechanical coating or over the thickness of the mechanical coating and one or more of the additional protective coatings, according to the transparency thereof to the laser radiation used for inscribing the Bragg grating.

The opening is adapted to allow the inscription of the patterns of a Bragg grating by passing a laser beam through it. The dimensions thereof are thus adapted to the dimensions of the laser beam and to the dimensions of the Bragg grating.

In particular, for a Bragg grating extending longitudinally over a portion of the optical fibre called the "sensitive portion", and an opening extending longitudinally over a portion of the optical fibre called the "cutout portion", the length of the cutout portion may be greater than or equal to the length of the sensitive portion.

It should be noted that the opening is partial over the periphery of the mechanical coating. In other words, the mechanical coating is not removed over the entire radial section of the cutout portion. This localised removal of material has the advantage of only slightly impacting on the mechanical properties of the optical fibre, in particular the breaking strength thereof. It is then not essential to fill in the space corresponding to the opening with an addition of material, for example metal or a polymer.

The opening can extend circumferentially over an angular sector defined so that it has, by projection in a plane parallel to a longitudinal axis of the optical fibre, a width greater than or equal to the diameter of the core. When the patterns of the Bragg grating have dimensions less than the diameter of the core, the width of the opening can be determined so as to be greater than or equal to the dimensions of the patterns of the Bragg grating. In this case, the width of the opening may be greater than or equal to the corresponding dimension of the patterns of the Bragg grating, that is to say the dimension of the patterns in said plane parallel to the longitudinal axis of the optical fibre. By way of example, the Bragg grating may be formed by spheres. The width of the opening may then be greater than or equal to the diameter of these spheres. The angular sector is for example between 0.5° and 120°. More precisely, it may be between 0.5° and 10° or between 75° and 120°.

The optical fibre sensor according to the invention may be arranged to provide distributed measurements of temperature and deformation. Thus the mechanical coating may include a plurality of openings, each opening extending radially over the entire thickness of the mechanical coating, and the optical fibre may include a plurality of Bragg gratings, each Bragg grating being inscribed in the core at one of the openings. Each opening preferably extends longitudinally over a cutout portion the length of which is greater than or equal to the length of the corresponding sensitive portion. The width of each opening is thus preferably greater than or equal to the diameter of the core or, at a minimum, to the dimensions of the patterns of the corresponding Bragg grating.

Another object of the invention is a method for manufacturing a Bragg grating optical fibre sensor from an optical fibre including a core, an optical cladding surrounding the core and a mechanical coating surrounding the optical cladding. According to the invention, the method comprises:
- a step of ablating the mechanical coating over a portion of the optical fibre, called the "cutout portion", so as to form an opening extending radially over the entire thickness of the mechanical coating, and
- a step of inscribing a Bragg grating in the core through the opening.

Prior to the ablation step, the mechanical coating typically covers the whole of the surface of the optical cladding. The mechanical coating is for example applied to the optical fibre during the process of manufacturing same, for example at the end of the drawing step.

The ablation step comprises for example an insolation of the mechanical coating by means of a laser beam focused in the vicinity of the mechanical coating, the laser beam being formed by femtosecond pulses. "Femtosecond pulse" refers to a pulse the duration of which is between a few femtoseconds, for example 2 fs, and a few hundreds of femtoseconds, for example 10,000 fs.

The ablation step may be configured so that the opening extends circumferentially over an angular sector defined so that the opening has, by projection in a plane parallel to a longitudinal axis of the optical fibre, a width greater than or equal to a corresponding dimension of the patterns of the Bragg grating. It may also be configured so that the opening extends circumferentially over an angular sector defined so that the opening has, by projection in a plane parallel to a longitudinal axis of the optical fibre, a width greater than or equal to a diameter of the core of the optical fibre. The ablation step is for example configured so that the opening extends circumferentially over an angular sector of between 0.5 degrees and 120 degrees. The angular sector is for example between 0.5 degrees and 10 degrees for a relatively narrow laser beam, and between 75 degrees and 120 degrees for a relatively wide laser beam.

The ablation step may comprise a sweeping of the laser beam over the mechanical coating. The sweeping may be optical or mechanical. It is for example implemented by means of a spatial light modulator. Sweeping is for example useful when the laser beam has, at the mechanical coating, a section the surface area of which is less than the surface area of the opening.

Moreover, the ablation step may comprise an insolation of each point on the mechanical coating corresponding to the opening by a plurality of pulses. A plurality of pulses is necessary when each pulse of the laser beam is able to remove a predetermined mechanical-coating thickness that is less than a thickness of the mechanical coating.

According to a particular embodiment, each pulse of the laser beam has an energy fluence greater than or equal to a threshold of energy fluence of ablation of the mechanical coating and less than or equal to (preferably strictly less than) a threshold of energy fluence of ablation of the optical cladding. Such an energy fluence makes it possible to remove the material of the mechanical coating without removing the material of the optical cladding. The threshold of optical fluence of ablation of gold, for a laser beam with a wavelength of 780 nm (nanometres) and a pulse duration of 150 fs is 0.5 $J/cm^2$ (Joules per square centimetre). The threshold of energy fluence of ablation of silica, for a laser beam with a wavelength of 825 nm and a pulse duration of 150 fs is 2 $J/cm^2$. Thus, for a laser beam with a wavelength of approximately 800 nm and a pulse duration of 150 fs, the energy fluence of the laser beam may be between 0.5 $J/cm^2$ and 1.9 $J/cm^2 \cdot k$.

Advantageously, the focal point of the laser beam is positioned upstream of the mechanical coating. In other words, the focal point of the laser beam is positioned at a distance from the surface of the mechanical coating, on the opposite side to the optical cladding. This positioning makes it possible to limit the level of energy fluence in the optical cladding in the event of a slight offset in the positioning of the focal point. This is because the energy fluence of the laser beam increases from the laser to reach a maximum at the focal point and decreases after the focal point. Thus, in the event of a shifting of the focal point, the energy fluence in the optical cladding remains lower than the energy fluence in the mechanical coating.

According to a first embodiment, the step of inscribing a Bragg grating comprises an insolation of the core of the optical fibre by an ultraviolet laser beam, the core of the optical fibre being photosensitive. The laser beam may be focused in the vicinity of the core of the optical fibre. It may be continuous or pulsed. Each pulse has for example a duration of between 5 ns (nanoseconds) and 500 ns.

According to a second embodiment, the step of inscribing a Bragg grating comprises an insolation of the core of the optical fibre by a femtosecond laser beam. The core of the optical fibre is not necessarily photosensitive. The inscription of the Bragg grating is then termed "direct writing". The laser beam may be focused in the vicinity of the core of the optical fibre. The wavelength of the laser beam may be situated in the range of wavelengths of infrared radiation (700 nm to 1 mm). The second embodiment has the advantage, compared with the first, of requiring only one laser source for successively implementing the ablation of the mechanical coating and the inscription of the Bragg grating.

The Bragg grating may be inscribed in point by point mode or in plane by plane mode.

The step of inscribing the Bragg grating may further include applying an index liquid to the surface of the optical cladding, the index liquid having a refractive index equal to (or substantially equal to) the refractive index of the optical cladding. Thus, in the case where the optical cladding has a surface irregularity due to the ablation of the mechanical coating, the index liquid makes it possible to form a surface that is smooth from an optical point of view.

According to a particular embodiment of the sensor or of the method for manufacturing same, the mechanical coating comprises a material the pyroscopic resistance of which is greater than or equal to 800° C. (degrees Celsius). In other words, the mechanical coating must withstand a minimum temperature of 800° C. without softening and without sagging under its own weight.

The mechanical coating may in particular comprise a metal or consist of one or more metals. The mechanical coating comprises for example aluminium, gold, copper, silver or nickel. The mechanical coating may also comprise boron, amorphous boron, alumina (aluminium oxide), a composition comprising silica and alumina, alumina-doped silica, zirconia (zirconium oxide), tin dioxide, titanium dioxide and/or a ceramic. In a particular embodiment, the mechanical coating comprises a plurality of layers, each of which consists of one or more materials.

The mechanical coating has for example a thickness of between 10 μm and 500 μm.

Producing a Bragg grating optical fibre sensor by inscribing the Bragg grating through a window formed in the mechanical coating has many advantages. As indicated previously, the material of the mechanical coating can be determined according to the mechanical properties thereof, in particular the pyroscopic resistance thereof, independently of the optical properties thereof. The dimensions of the window being relatively small, the optical fibre is only slightly weakened. In particular, compared with an optical fibre the mechanical coating of which is completely removed over the periphery of a portion, the optical fibre keeps a mechanical strength close to the initial mechanical strength thereof. Moreover, according to the material and dimensions of the mechanical coating, the optical fibre can keep a certain flexibility.

BRIEF DESCRIPTION OF THE DRAWINGS

Other features, details and advantages of the invention will be clear from the reading of the following description, given solely by way of example and made with reference to the accompanying drawings, for which:

FIG. 1A shows, in a perspective view, an example of a Bragg grating optical fibre sensor according to the invention;

FIG. 1B shows, in a view in longitudinal section, the sensor of FIG. 1A;

FIG. 2 shows an example of a method for manufacturing a Bragg grating optical fibre sensor according to the invention;

DETAILED DESCRIPTION OF PARTICULAR EMBODIMENTS

Figure 3:
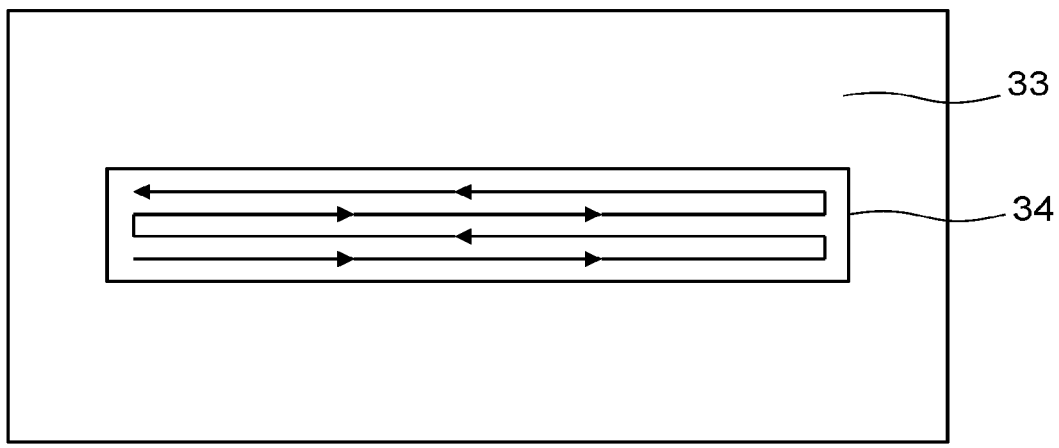
FIG. 3 shows a sweeping of the optical fibre carried out during a step of ablating the mechanical coating.

FIGS. 1A and 1B show, in a perspective view and in a view in longitudinal section, respectively, an example of a Bragg grating optical fibre sensor according to the invention. Only a portion of the optical fibre sensor is shown in these figures. The optical fibre sensor 1 comprises an optical fibre 2 and a Bragg grating 3, visible in FIG. 1B. The optical fibre 2 includes a core 21, an optical cladding 22 surrounding the core 21 and a mechanical coating 23 surrounding the optical cladding 22, The optical fibre 2 is typically a single-mode optical fibre. The dimensions thereof are adapted to the transport of the optical signal used for the measurement by the Bragg grating 3. The core has for example a diameter of less than or equal to 10 μm, the optical cladding a diameter of between 80 μm and 150 μm and the mechanical coating a diameter of between 200 μm and 400 μm. The function of the mechanical coating 23 is to mechanically and/or chemically protect the optical cladding. It may in particular comprise a material the pyroscopic resistance of which is greater than or equal to a maximum temperature of use of the optical fibre sensor 1. The material of the protective coating has for example a pyroscopic resistance greater than or equal to 350° C., preferably greater than or equal to 800° C. It may comprise a refractory material such as aluminium oxide or zirconium oxide. It may also comprise a metal such as aluminium, gold, copper, silver or nickel. The Bragg grating 3 is inscribed in the core 21. It is formed by a set of patterns the refractive index of which differs from the refractive index of the core 21. According to the invention, the mechanical coating 23 comprises an opening or window 24 extending radially over the entire thickness thereof, that is to say between the internal surface thereof, in contact with the optical cladding 22, and the external surface thereof also forming the external surface of the optical fibre 2. The opening 24 is arranged to enable a laser beam to pass for inscribing the Bragg grating 3. The dimensions thereof are thus adapted both to the dimensions of the laser beam and to the dimensions of the Bragg grating. Thus, for a Bragg grating 3 extending longitudinally over a portion of the optical fibre 2 called the "sensitive portion", the opening 24 may extend longitudinally over a portion of optical fibre, called the "cutout portion", the length of which is greater than or equal to the length of the sensitive portion. Moreover, the opening 24 may extend circumferentially over an angular sector defined so that it has, by projection in a plane parallel to a longitudinal axis of the optical fibre, a width greater than or equal to the diameter of the core 21. Since the width of the patterns of the Bragg grating may be less than the diameter of the core 21, the opening 24 may have a projected width less than the diameter of the core and greater than or equal to the dimensions of the pattern of the Bragg grating. By way of example, the angular sector defining the opening 24 may be between 0.5° and 120°.

The Bragg grating optical fibre sensor according to the invention is adapted both to an isolated measurement of temperature and/or deformation and to a distributed measurement. In the latter case, the optical fibre sensor includes a plurality of openings disposed on various cutout portions of the optical fibre and a plurality of Bragg gratings inscribed on sensitive portions, each Bragg grating being associated with an opening.

FIG. 2 shows an example of a method for manufacturing a Bragg grating optical fibre sensor according to the invention. The optical fibre sensor is produced from an optical fibre including a core, an optical cladding surrounding the core and a mechanical coating surrounding the optical cladding. The optical fibre is typically a single-mode optical fibre. In a first step S21, an opening or window is formed by ablation of the mechanical coating. As indicated previously, the opening extends radially over the entire thickness of the mechanical coating and extends axially over a cutout portion that is sufficiently long for a laser beam to pass allowing inscription of a Bragg grating. In a second step S22, a Bragg grating is inscribed in the optical fibre through the opening.

The step S21 of ablating the mechanical coating may comprise an insolation of the mechanical coating by a femtosecond laser beam focused in the vicinity of the mechanical coating. The properties of the laser beam applied for ablating the mechanical coating are dependent in particular on the material and dimensions of the mechanical coating. In particular, each pulse of the laser beam has an energy fluence greater than or equal to a threshold of energy fluence of ablation of the material of the mechanical coating. For gold, the threshold of ablation energy fluence is 0.5 $J/cm^2$ for a wavelength of 780 nm and a pulse duration of 150 fs. For aluminium, the threshold of ablation energy fluence is 0.11 $mJ/cm^2$ for a wavelength of 800 nm and a pulse duration of 150 fs. In order to avoid damaging the optical cladding, the energy fluence of the pulses of the laser beam is preferably determined so as to be strictly lower than the threshold of energy fluence of ablation of the optical cladding. For an optical cladding made from silica, the threshold of ablation energy fluence is 2 $J/cm^2$ for a wavelength of 825 nm and a pulse duration of 150 fs. The energy fluence of the pulses of the laser beam has an influence on the depth of the material removed. The energy fluence can thus be determined according to the thickness of the mechanical coating. It can in particular be determined so that a single pulse or an integer number of pulses allows removal of the mechanical coating over the entire thickness thereof. For determining the properties of the laser beam to be applied for ablating the mechanical coating, a person skilled in the art will in particular be able to refer to the following documents:

Le Harzic R. et al: "Pulse width and energy influence on laser micromachining of metals in a range of 100 ps to 5 ps", Applied Surface Science 249, 322-331, 2005;

Gamaly E. G. et al: "Ablation of solids by femtosecond lasers: Ablation mechanism and ablation thresholds for metals and dielectric", Physics of Plasma 9, 949-957, 2002;

Stuart B. C. et al: "Optical ablation by high-power short-pulse lasers", J. Opt. Soc. Am. B, 459-468, 1996.

Moreover, when each laser pulse gives rise to an ablation zone the surface area of which is less than the surface area of the opening, a sweep of the optical fibre by the laser beam is necessary. FIG. 3 illustrates an ablation of the mechanical coating including a sweep in a plane. On this figure, an optical fibre 30 is shown in a plan view. It includes in particular a mechanical coating 33 wherein an opening 34 is formed. The sweep includes a succession of four passes, each pass being made along an axis parallel to the longitudinal axis of the optical fibre. This sweep may be carried out optically, for example by means of a spatial light modulator or a galvanometric mirror associated with a focusing lens, or mechanically, by moving the laser or an optical element with respect to the optical fibre. When the ablation zone has a width less than the width of the opening, the sweep may be made along a single axis. On the other hand, when both the width and the length of the opening are greater than the width and the length of the ablation zone respectively, a sweep in a plane is necessary. Alternatively, the sweep may be made by translation and rotation about the longitudinal axis of the optical fibre.

Figure 4:
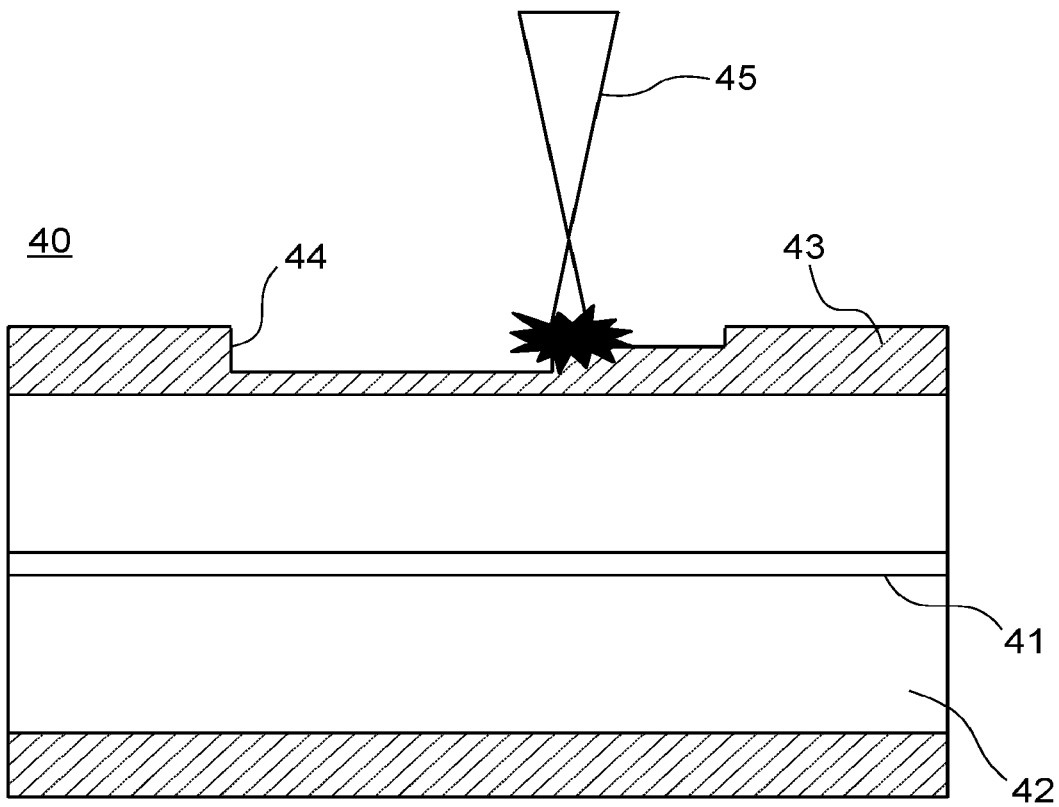
FIG. 4 shows an example of positioning of the focal point of a laser beam used during a step of ablating the mechanical coating.

FIG. 4 illustrates a particular embodiment wherein the focal point of the laser beam is positioned upstream of the mechanical coating. In this figure, the optical fibre 40 is shown in a view in longitudinal section. The optical fibre 40 includes a core 41, an optical cladding 42 surrounding the core 41 and a mechanical coating 43 surrounding the optical cladding 42. A laser beam 45 is applied to the surface of the mechanical coating 43 so as to form an opening 44. In this example embodiment, a sweep is necessary to form the opening 44. In addition, a plurality of pulses are necessary at each point in the opening in order to remove the material over the entire thickness of the mechanical coating 43. As illustrated schematically in FIG. 4, the laser beam 45 is focused upstream of the external surface of the mechanical coating 43. Since the energy fluence reaches a maximum value at the focal point and decreases beyond the focal point, this configuration makes it possible to guarantee that the energy fluence in the optical cladding will be less than the energy fluence in the mechanical coating, even in the event of a shift of the focal point.

The step S22 of inscribing a Bragg grating may comprise the insolation of the core of the optical fibre by an ultraviolet laser beam. In this case, the core of the optical fibre must be photosensitive. The laser beam is preferably focused in the vicinity of the core of the optical fibre, more preferentially inside the core. The laser beam may be continuous or pulsed. In the latter case, the duration of the pulses is for example between 5 ns and 500 ns.

Alternatively, the step S22 of inscribing a Bragg grating may comprise the insolation of the core of the optical fibre by a femtosecond laser beam. The core of the optical fibre is then not necessarily photosensitive. The laser beam is preferably focused in the vicinity of the core of the optical fibre, more preferentially inside the core. The wavelength of the laser beam may be situated in the wavelength range of infrared radiation, that is to say in the range from 700 nm to 1 mm. Inscribing the Bragg grating by a femtosecond laser has the advantage of being able to be done by means of the same laser source as the one for ablating the mechanical coating.

The invention claimed is:

1. A Bragg grating optical fibre sensor, comprising:
   an optical fibre including a core;
   an optical cladding surrounding the core; and
   a mechanical coating surrounding the optical cladding, wherein the mechanical coating includes a metal and an opening arranged to enable patterns of a Bragg grating to be inscribed by passing a laser beam through said opening, the opening extending radially over an entire thickness thereof, and the optical fibre includes the Bragg grating inscribed in the core at the opening.

2. The optical fibre sensor of claim 1, wherein the opening extends circumferentially over an angular sector defined so that the opening has, by projection in a plane parallel to a longitudinal axis of the optical fibre, a width greater than or equal to a corresponding dimension of the patterns of the Bragg grating.

3. The optical fibre sensor of claim 1, wherein the opening extends circumferentially over an angular sector defined so that the opening has, by projection in a plane parallel to a longitudinal axis of the optical fibre, a width greater than or equal to a diameter of the core of the optical fibre.

4. The optical fibre sensor of claim 1, wherein the opening extends circumferentially over an angular sector of between 0.5 degrees and 120 degrees.

5. The optical fibre sensor of claim 1, wherein the Bragg grating extends longitudinally over a sensitive portion of the optical fibre and the opening extends longitudinally over a cutout portion of the optical fibre, a length of the cutout portion being greater than or equal to a length of the sensitive portion.

6. The optical fibre sensor of claim 1, wherein the mechanical coating includes a plurality of openings, each opening being arranged to allow inscription of the patterns of the Bragg grating by passing a laser beam through said opening and extending radially over the entire thickness of the mechanical coating, the optical fibre including a plurality of Bragg gratings, each Bragg grating being inscribed in the core at one of the openings.

7. The optical fibre sensor of claim 1, wherein the mechanical coating comprises a material the pyroscopic resistance of which is greater than or equal to 800° C.

8. The optical fibre sensor of claim 1, wherein the mechanical coating consists of one or more metals.

9. The optical fibre sensor of claim 1, wherein the mechanical coating has a thickness of between 10 micrometres and 500 micrometres.

10. A method for manufacturing a Bragg grating optical fibre sensor from an optical fibre including a core, an optical cladding surrounding the core, and a mechanical coating surrounding the optical cladding, the mechanical coating comprising a metal, the method comprising:

ablating the mechanical coating over a cutout portion of the optical fibre so as to form an opening extending radially over an entire thickness of the mechanical coating; and inscribing a Bragg grating in the optical fibre through the opening, wherein the ablating comprises an insolation of the mechanical coating by a laser beam focused in a vicinity of the mechanical coating, the laser beam being formed by femtosecond pulses.

11. The method of claim 10, wherein the ablating comprises circumferentially extending the opening over an angular sector defined so that the opening has, by projection in a plane parallel to a longitudinal axis of the optical fibre, a width greater than or equal to a corresponding dimension of patterns of the Bragg grating.

12. The method of claim 10, wherein the ablating comprises circumferentially extending the opening over an angular sector defined so that the opening has, by projection in a plane parallel to a longitudinal axis of the optical fibre, a width greater than or equal to a diameter of the core of the optical fibre.

13. The method of claim 10, wherein the ablating comprises circumferentially extending the opening over an angular sector of between 0.5 degrees and 120 degrees.

14. The method of claim 10, wherein the ablating comprises sweeping the laser beam over the mechanical coating.

15. The method of claim 10, wherein the ablating comprises an insolation of a portion on the mechanical coating corresponding to the opening by a plurality of pulses.

16. The method of claim 10, wherein each pulse of the laser beam has an energy fluence greater than or equal to a threshold of energy fluence of ablation of the mechanical coating and less than or equal to a threshold of energy fluence of ablation of the optical cladding.

17. The method of claim 10, wherein a focal point of the laser beam is positioned upstream of the mechanical coating.

18. The method of claim 10, wherein the inscribing of the Bragg grating comprises an insolation of the core of the optical fibre by an ultraviolet laser beam, the core of the optical fibre being photosensitive.

19. The method of claim 10, wherein the inscribing of the Bragg grating comprises an insolation of the core of the optical fibre by a femtosecond laser beam pulse.

20. The method of claim 10, wherein the mechanical coating comprises a material the pyroscopic resistance of which is greater than or equal to 800° C.

* * * * *